(12) United States Patent
Tapson

(10) Patent No.: US 7,277,488 B2
(45) Date of Patent: Oct. 2, 2007

(54) DATA PROCESSING APPARATUS AND METHOD

(75) Inventor: Daniel Warren Tapson, Basingstoke (GB)

(73) Assignee: Sony United Kingdom Limited, Weybridge (GB)

( * ) Notice: Subject to any disclaimer, the term of this patent is extended or adjusted under 35 U.S.C. 154(b) by 783 days.

(21) Appl. No.: 10/612,738

(22) Filed: Jul. 2, 2003

(65) Prior Publication Data

US 2004/0071213 A1    Apr. 15, 2004

(30) Foreign Application Priority Data

Jul. 4, 2002    (GB) ................................. 0215495.3

(51) Int. Cl.
*H04N 7/12* (2006.01)

(52) U.S. Cl. .............................. 375/240.16; 375/240.02

(58) Field of Classification Search ........... 375/240.19, 375/240.02, 240.01; 382/100; 380/54; 713/176; 386/94; 283/17, 113

See application file for complete search history.

(56) References Cited

U.S. PATENT DOCUMENTS 5,664,018 A * 9/1997 Leighton ..................... 380/54
6,282,650 B1 * 8/2001 Davis ......................... 713/176
6,647,129 B2 * 11/2003 Rhoads ....................... 382/100
2003/0112996 A1 * 6/2003 Holliman et al. ........... 382/100
2003/0200439 A1 * 10/2003 Moskowitz .................. 713/176
2006/0005029 A1 * 1/2006 Petrovic et al. ............. 713/176

FOREIGN PATENT DOCUMENTS

WO    WO 02/15587    2/2002

* cited by examiner

*Primary Examiner*—Gims Philippe
(74) *Attorney, Agent, or Firm*—Oblon, Spivak, McClelland, Maier & Neustadt, P.C.

(57) ABSTRACT

An encoding data processing apparatus generates at least one water marked version of an original item of material formed by introducing one of a predetermined set of code words into a copy of the original material item. The apparatus has a bandwidth adaptation processor configured to adapt a bandwidth of the code word to at least part of a bandwidth of the original material item, and an encoder configured to combine the bandwidth adapted code word with a copy of the original material item. The probability of correctly detecting a code word is improved by combining the code word with a part of the bandwidth of the material item. As a result, if the material is transformed in some way the code word may still be detected.

32 Claims, 8 Drawing Sheets

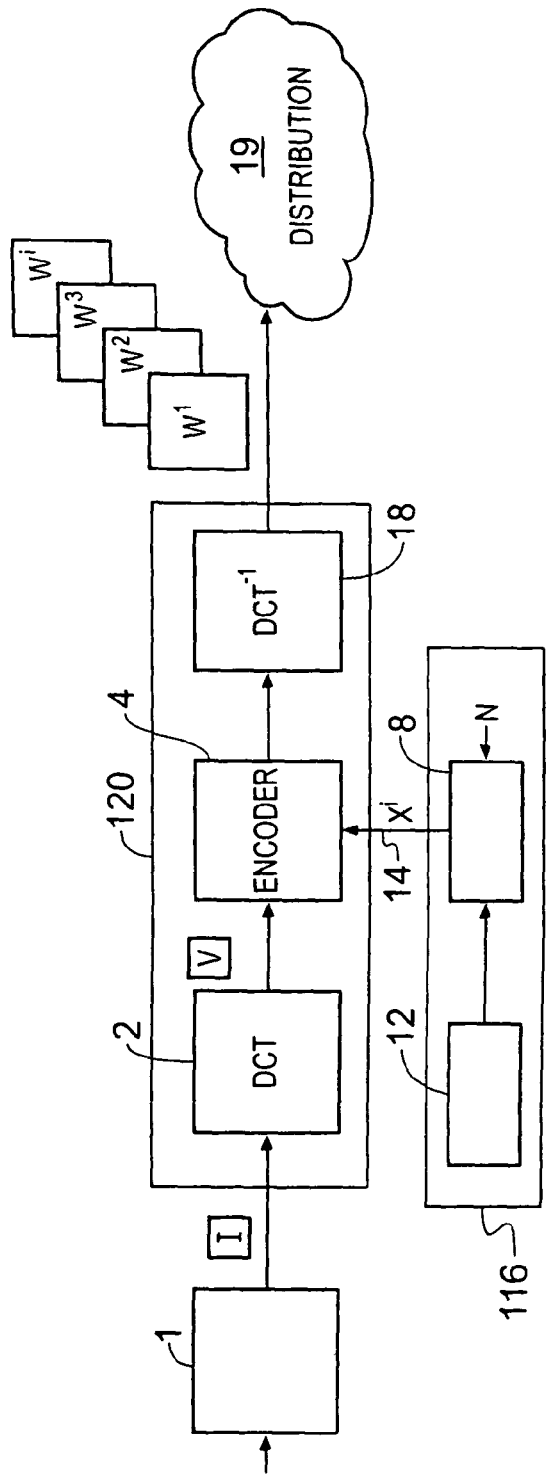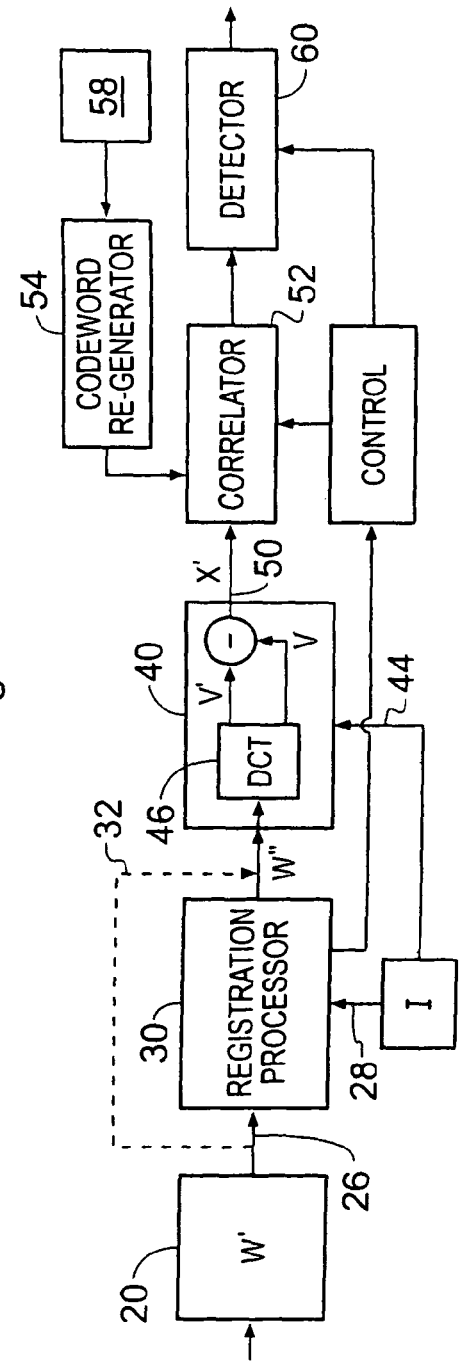

DATA PROCESSING APPARATUS AND METHOD

FIELD OF INVENTION

The present invention relates to encoding data processing apparatus and methods, which are arranged to introduce code words into versions of material items. In some applications the code words are used to uniquely identify the material items.

Correspondingly, the present invention also relates to data processing apparatus and methods operable to detect one or more code words, which may be present in a material item.

BACKGROUND OF THE INVENTION

A process in which information is embedded in material for the purpose of identifying the material is known as watermarking. Watermarking can provide a facility for identifying a recipient of a particular version of the material. As such, if the material is copied or used in a way, which is inconsistent with the wishes of the distributor of the material, the distributor can identify the material version from the identification code word and take appropriate action.

In this description, an item of material, which is copied or used in a way, which is inconsistent with the wishes of the originator, owner, creator or distributor of the material, will be referred to for convenience as an offending item of material or offending material. The material could be any of video, audio, audio/video material, software programs, digital documents or any type of information bearing material.

Any watermarking scheme should be arranged to make it difficult for users receiving copies of the same material to collude to either mask a watermark code word or alter a watermark code word. A watermarking scheme should therefore with high probability identify a marked material item, which has been the subject of a collusion attack. This is achieved by identifying a code word recovered from the offending material. Conversely, there should be a low probability of not detecting a code word when a code word is present (false negative probability). In addition the probability of falsely detecting a user as guilty of taking part in a collusion attack, when this user has not taken part, should be as low as possible (false positive probability).

U.S. Pat. No. 5,664,018 discloses a watermarking process in which a plurality of copies of material items are marked with a digital watermark formed from a code word having a predetermined number of coefficients. The watermarked material item is for example an image. The apparatus for introducing the watermark transforms the image into the Discrete Cosine Transform (DCT) domain. The digital watermark is formed from a set of randomly distributed coefficients having a normal distribution. In the DCT domain each code word coefficient is added to a corresponding one of the DCT coefficients. The watermarked image is formed by performing an inverse DCT. A related publication entitled "Resistance of Digital Watermarks to Collusion Attacks", by J. Kilian, F. T. Leighton et al, published by MIT, Jul. 27, 1998, provides a detailed mathematical analysis of this watermarking process to prove its resistance to attack. Co-pending UK patent applications 0129865.2, 0129841.3, 0129840.5, 0129907.2 and 0129836.3 disclose encoding and detecting apparatus and methods which aim to provide a practical watermarking system, which utilises code words having coefficients which are randomly distributed as proposed in U.S. Pat. No. 5,664,018.

SUMMARY OF INVENTION

An object of the present invention is to provide an improvement to watermarking systems, by, for example, increasing a likelihood of detecting a code word present in an offending material item. Accordingly, it is also an object of the present invention to improve the false positive and negative detection probabilities.

According to the present invention there is provided an encoding data processing apparatus for generating at least one version of an original item of material formed by combining one of a predetermined set of code words into a copy of the original material item. The apparatus comprises a bandwidth adaptation processor operable to adapt a bandwidth of the code word with respect to the bandwidth of the original material item. An encoder is operable to combine the bandwidth-adapted code word with a copy of the original material item, with an effect that the code word is combined with part of the bandwidth of the material item. In preferred embodiments the code word is embedded into the low frequency components of the material item.

Embodiments of the present invention provide an improvement to watermarking systems, by increasing a likelihood of detecting a code word present in an offending material item. Accordingly, the false positive and negative probabilities are improved. In previously proposed watermarking arrangements, such as disclosed in 0129907.2, it has been proposed to embed the same code word into different video frames. However, it has been discovered that the probability of correctly detecting a code word is improved by combining the code word with a reduced bandwidth part of the material item. For example, in some embodiments the code word may be combined with a low frequency part of the material item. As a result, if the material is transformed in some way, the code word may still be detected. For the example of a pirate copy of a motion picture film, a difference in a frame rate of the film with respect to the video frame rate may have an effect of temporally filtering the original film. As such, if the code word were to be embedded in each frame, there would be a reduced likelihood of correctly detecting the code word, since each frame would lose the part of the code word which has been combined with the high frequency components of the material. Furthermore, if the pirate copy was to have an effect of spatially distorting the film, the spatial distortion may also reduce the likelihood of correctly detecting the code word. As such, by embedding the code word into the low frequency spatial or temporal components of the material an improved resistance to temporal or spatial distortion is provided. As a result, the probability of correctly detecting a code word is improved.

In preferred embodiments, in order to introduce the code word into a part of the bandwidth of the material item, such as the low bandwidth part, the code word is assumed to have a low bandwidth. The bandwidth of the code word is then increased in accordance with the total bandwidth or part of the total bandwidth of the material to which the code word is to be combined. For the example of material such as video material or motion films, the up-conversion may be effected temporally or spatially.

According to an aspect of the present invention there is provided a detecting data processing apparatus operable to determine whether one or more code words of a predetermined set of code words is present in a suspected version of a material item. The detecting apparatus comprises a bandwidth processor operable to form a reduced-bandwidth-version of a copy of the original material item and a reduced-bandwidth-version of the suspected version of the material, or a reduced-bandwidth-version of a difference between the original and suspect material items. The bandwidth reduction is arranged to isolate the part of the bandwidth of the material to which the code word may have been combined. A recovery processor is operable to generate a recovered code word from the reduced-bandwidth-versions of the original and suspect material items or reduced-bandwidth-version difference between the suspect and original material items. A correlation processor operable to generate, for each of the code words in the predetermined set of code words a correlation value by correlating the recovered code word with each of the generated code words. A detection processor operable to detect one or more code words from the correlation value for the code word exceeding a predetermined threshold.

Various further aspects and features of the present invention are defined in the appended claims.

BRIEF DESCRIPTION OF DRAWINGS

Embodiments of the present invention will now be described by way of example only with reference to the accompanying drawings, where like parts are provided with corresponding reference numerals, and in which:

FIG. 1 is a schematic block diagram of a data processing apparatus which operates as a watermark encoder;

FIG. 2 is a schematic block diagram of a detecting data processing apparatus;

DESCRIPTION OF PREFERRED EMBODIMENTS

Watermarking System Overview

Figure 3:
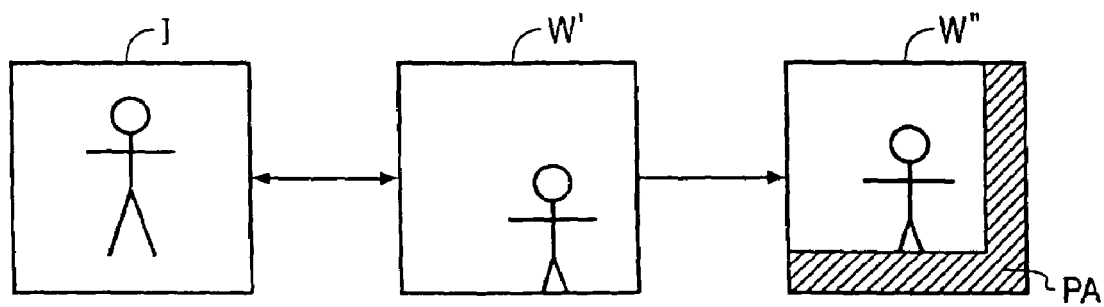
FIG. 3A is a representation of an original image.
FIG. 3B is a representation of a marked image and FIG. 3C is the marked image after registration.

An explanation of a watermarking technique utilised by embodiments of the present invention will now be described with reference to protecting, for example video images. The number of users to which the video images are to be distributed determines the number of copies. A watermark code word is added to each copy which identifies the copy assigned to one of the users.

Video images are one example of material, which can be protected by embedding a digital code word. Other examples of material, which can be protected by embedding a code word, include software programs, digital documents, music, audio signals, audio/visual material, multi-media content and any other information-bearing signal.

An example of an encoding image processing apparatus, which is arranged to introduce an identification code word into a copy of an original image, is shown in FIG. 1. An original image I is received from a source and stored in a frame store 1. This original image is to be reproduced as a plurality of water marked copies, each of which is marked with a uniquely identifiable code word. The original image is passed to a Discrete Cosine Transform (DCT) processor 2, which divides the image into 8×8 pixel blocks and forms a DCT of each of the 8×8 pixel blocks. The DCT processor 2 therefore forms a DCT transformed image V.

In the following description the term "samples" will be used to refer to discrete samples from which an image (or indeed any other type of material) is comprised. The samples may be luminance samples of the image, which are otherwise, produced from the image pixels. Therefore, where appropriate the terms samples and pixels are inter-changeable.

The DCT image V is fed to an encoding processor 4. The encoding processor 4 also receives identification code words from an identification code word generator 8.

The code word generator 8 is provided with a plurality of seeds, each seed being used to generate one of the corresponding code words. Each of the generated code words may be embedded in a copy of the original image to form a watermarked image. The code word generator 8 is provided with a pseudo random number generator. The pseudo random number generator produces the code word coefficients to form a particular code word. In preferred embodiments the coefficients of the code words are generated in accordance with a normal distribution. However, the coefficients of the code word are otherwise predetermined in accordance with the seed, which is used to initialise the random number generator. Thus, for each code word there is a corresponding seed which is stored in a data store 12. Therefore, it will be understood that to generate the code word $X^i$, $seed_i$ is retrieved from memory 12 and used to initialise the random number generator within the code word generator 8.

In the following description the DCT version of the original image is represented as V, where;

$$V=\{v_i\}=\{v_1,v_2,v_3,v_4,\ldots v_N\}$$

and $v_i$ are the DCT coefficients of the image. In other embodiments the samples of the image $v_i$ could represent samples of the image in the spatial domain or in an alternative domain.

Each of the code words $X^i$ comprises a plurality of n code word coefficients, where;

$$X^i=\{x_j^i\}=\{x_1^i, x_2^i, x_3^i, x_4^i, \ldots x_n^i\}$$

The number of code word coefficients n corresponds to the number or samples of the original image V. However, a different number of coefficients is possible, and will be determined in dependence upon a particular application.

A vector of code word coefficients $X^i$ forming the i-th code word is then passed via channel 14 to the encoder 4.

The encoder 4 is arranged to form a watermarked image $W_i$ by adding the code word $X^i$ to the image V. Effectively, therefore, as represented in the equation below, each of the code word coefficients is added to a different one of the coefficients of the image to form the watermark image $W_i$.

$$W^i = V + X^i$$

$$W^i = v_1 + x_1{}^i, v_2 + x_2{}^i, v_3 + x_3{}^i, v_4 + x_4{}^i, \ldots, v_n + x_n{}^i$$

As shown in FIG. 1, the watermarked images $W_i$ are formed at the output of the image processing apparatus by forming inverse DCT of the image produced at the output of the encoding processor 4 by the inverse DCT processor 18.

Therefore as represented in FIG. 1 at the output of the encoder 4 a set of the watermarked images can be produced. For a data word of up to 20-bits, one of 10 000 000 code words can be selected to generate 10 million watermarked $W_j$ versions of the original image I.

As shown in FIG. 1, the DCT processor 2, the encoding processor 4 and the inverse DCT processor 18 form a watermark encoder 120. The watermark encoder 120 also forms part of a data processing apparatus shown in FIG. 5, which will be explained shortly. Furthermore the data store 12 and the code word generator 8 form a watermark generator 116, which also appears in FIG. 5.

Although the code word provides the facility for uniquely identifying a marked copy $W_i$ of the image I, in other embodiments the 20 bits can provide a facility for communicating data within the image. As will be appreciated therefore, the 20 bits used to select the identification code word can provide a 20 bit pay-load for communicating data within the image V.

The encoding image processing apparatus which is arranged to produce the watermarked images shown in FIG. 1 may be incorporated into a variety of products for different scenarios in which embodiments of the present invention find application. Generally the distribution of the watermarked images produced by the encoding image processing apparatus shown in FIG. 1 is represented by a distribution cloud 19.

Detecting Processor

A detecting image processing apparatus which is arranged to detect one or more of the code words, which may be present in an offending marked image is shown in FIG. 2. Generally, the image processor shown in FIG. 2 operates to identify one or more of the code words, which may be present in an offending copy of the image.

The offending version of the watermarked image W' is received from a source and stored in a frame store 20. Also stored in the frame store 24 is the original version of the image I, since the detection process performed by the image processor requires the original version of the image. The offending watermarked image W' and the original version of the image are then fed via respective connecting channels 26, 28 to a registration processor 30.

As already explained, a suspect version of the image W' may have been produced by photographing or otherwise reproducing a part of the watermarked image $W^i$. As such, in order to improve the likelihood of detecting the identification code word, the registration processor 30 is arranged to substantially align the offending image with the original version of the image present in the data stores 20 and 24. The purpose of this alignment is to provide a correspondence between the original image samples I and the corresponding samples of the watermarked image $W^i$ to which the code word coefficients have been added.

The effects of the registration are illustrated in FIG. 3. In FIG. 3 an example of the original image I is shown with respect to an offending marked version of the image W'. As illustrated in FIG. 3, the watermarked image W' is offset with respect to the original image I and this may be due to the relative aspect view of the camera from which the suspect version of the watermarked image was produced.

In order to recover a representation of the code word coefficients, the correct samples of the original image should be subtracted from the corresponding samples of the marked offending image. To this end, the two images are aligned. As shown in FIG. 3, the registered image W''' has a peripheral area PA which includes parts which were not present in the original image.

As will be appreciated in other embodiments, the registration processor 30 may not be used because the offending image W' may be already substantially aligned to the originally version of the image I, such as, for example, if the offending version was downloaded via the Internet. Accordingly, the detecting image processor is provided with an alternative channel 32, which communicates the marked image directly to the recovery processor 40.

The registered image W''' is received by a recovery processor 40. The recovery processor 40 also receives a copy of the original image I via a second channel 44. The registered image W''' and the original image I are transformed by a DCT transform processor 46 into the DCT domain. An estimated code word X' is then formed by subtracting the samples of the DCT domain marked image V' from the DCT domain samples of the original image V as expressed by the following equations:

$$X' = V' - V$$
$$= v'_1 - v_1, v'_2 - v_2, v'_3 - v_3, v'_4 - v_4, \ldots, v'_n - v_n,$$
$$= x'_1, x'_2, x'_3, x'_4, \ldots x'_n$$

The output of the recovery processor 40 therefore provides, on a connecting channel 50, an estimate of the coefficients of the code word which is to be identified. The recovered code word X' is then fed to a first input of a correlator 52. The correlator 52 also receives on a second input the regenerated code words $X^i$ produced by the code word generator 54. The code word generator 54 operates in the same way as the code word generator 8 which produces all possible code words of the set, using the predetermined seeds which identify uniquely the code words from a store 58.

The correlator 52 forms n similarity sim(i) values. In one embodiment, the similarity value is produced by forming a correlation in accordance with following equation:

$$sim(i) = \frac{X^i \cdot X'}{\sqrt{X^i \cdot X'}} = \frac{x^i_1 \cdot x'_1 + x^i_2 \cdot x'_2 + x^i_3 \cdot x'_3 + \ldots + x^i_n \cdot x'_n}{\sqrt{x^i_1 \cdot x'_1 + x^i_2 \cdot x'_2 + x^i_3 \cdot x'_3 + \ldots + x^i_n \cdot x'}}$$

Figure 4:
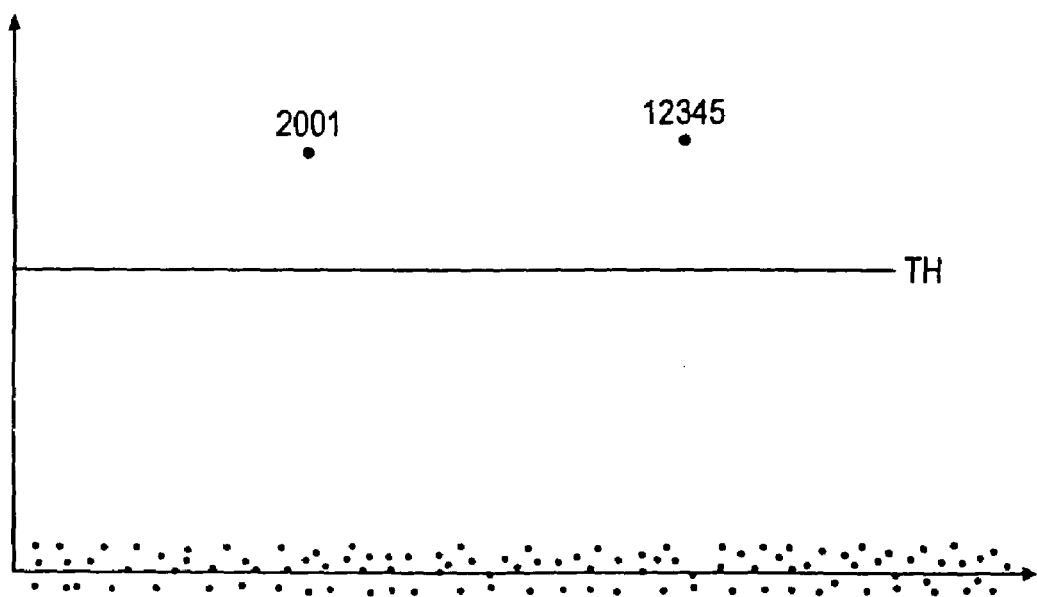
FIG. 4 is a graphical representation of an example correlation result for each of a set of N code words.

Each of the n similarity values sim(i) is then fed to a detector 60. The detector 60 then analyses the similarity values sim(i) produced for each of the n possible code words. As an example, the similarity values produced by the correlator 52 are shown in FIG. 4 with respect to a threshold TH for each of the possible code words. As shown in FIG. 4, two code words are above the threshold, 2001, 12345. As such, the detecting processor concludes that the watermarked version associated with code word 2001 and code word 12345 must have colluded in order to form the offending image. Therefore, in accordance with a false positive detection probability, determined from the population size, which in this case is 10 million, and the watermarking strength α, the height of the threshold TH can be set in order to guarantee the false detection probability. As in the example in FIG. 4, if the similarity values produced by the correlator 52 exceed the threshold then, with this false positive probability, the recipients of the marked image are considered to have colluded to form the offending watermarked version of the image $W^i$.

Bandwidth Adaptive Encoding Data Processor

Figure 5:
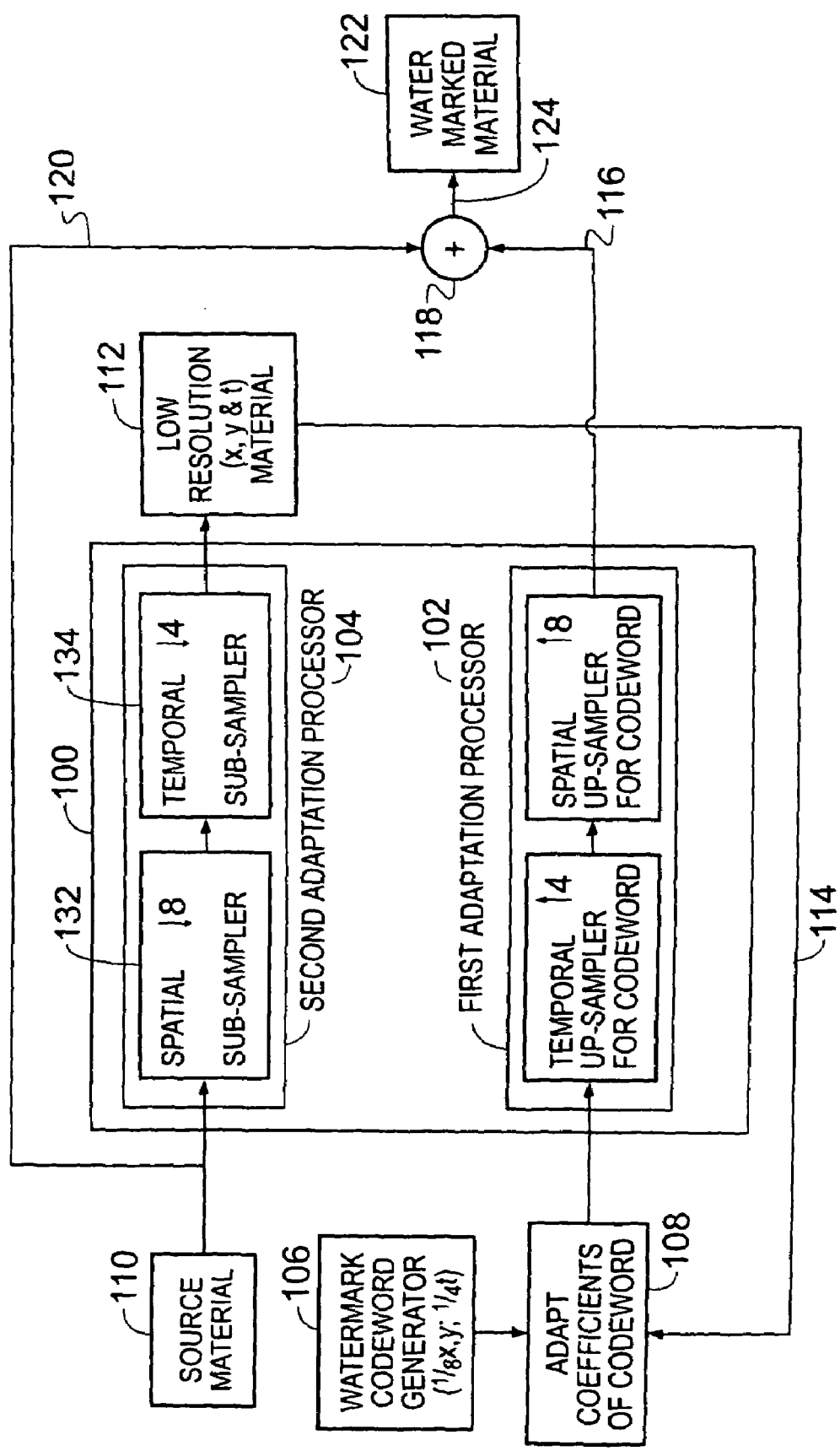
FIG. 5 is a schematic block diagram of an encoding data processor according to an embodiment of the invention.

An improved encoding data processor according to an embodiment of the invention is shown in FIG. 5. As will be explained shortly, the encoding data processor is arranged to introduce a code word into a part of the bandwidth of a material item. In the example embodiment shown in FIG. 5, the code word is introduced into a low bandwidth part of a material item such as for example a motion picture film or video recording. As will be explained, this is effected by assuming that the code word corresponds to a low bandwidth part of the material. The bandwidth of the code word is then up-converted to the bandwidth of the material and combined with a copy of the material to form a watermarked version of the material. However in other embodiments the code word may be combined with another portion of the material item bandwidth.

The encoding data processor shown in FIG. 5 comprises a bandwidth processor 100 formed from a first adaptation processor 102 and a second adaptation processor 104. A watermark code word generator 106 generates code words, which are fed via a code word processor 108 to the first adapter 102. An original material item is fed from a source 110 to the second bandwidth adaptation processor 104.

The first adaptation processor 102 is operable to increase the bandwidth of the code word to the bandwidth of the material item. The second adaptation processor 104 is operable to form a reduced-bandwidth-version of the original material item, which is fed to a registration processor 112. The registration processor is operable to associated the samples of the reduced-bandwidth-version of the material item with the coefficients of the code word which are to be added to the material item. In order to reduce a likelihood of the code word being perceivable in the material item after the code word has been combined with the material item, the code word coefficients are adapted in accordance with a sensitivity of the material to carry the coefficients. To this end, the samples to which the code word coefficients are to be added by the watermark processor 108, are made available to the watermark processor 108, from the registration processor 112 via a connecting channel 114. Techniques for adapting the code word coefficients in accordance with a sensitivity of the material to carry the coefficients whilst maintaining a predetermined false positive and false negative detection probability are detailed in co-pending UK patent applications number 0129865.2.

The increased bandwidth version of he code word is fed to a first input 116 of a combining processor 118. To a second input 120 of the combining processor 118, a copy of the original material item is fed. The combining processor is arranged to combine the increased bandwidth version of the code word with the copy of the material item to form a watermarked version 122 of the material item at an output 124. Therefore, in combination, than bandwidth adaptation processor 100 and the combining processor 118 combine the code word with the low frequency components of the material item. As will be appreciated in other embodiments the code word may be combined in another portion of the bandwidth of the material item.

The bandwidth reduction performed by the second adaptation processor 104 should correspond to the bandwidth increase applied by the first adaptation processor 102. As a result, the reduced-bandwidth-version of the material item should have a bandwidth which is substantially the same as the watermark code word. As will be appreciated, by matching the bandwidth reduction applied to the material item to the bandwidth of the code word, the samples of the reduced-bandwidth-version of the material item and the code word coefficients can be associated by the registration processor 112. Accordingly, the watermark processor 108 can adapt the coefficients of the code word in accordance with the sensitivity of the samples to carry the code word. However some embodiments may not include the second adaptation processor 104, the registration processor 112 or the watermark processor 108. Such embodiments would only require the first adaptation processor of the bandwidth processor 100 and the combining processor 118.

As explained above, the first adaptation processor 102 is arranged to increase the bandwidth of the watermark code word, so the that increased bandwidth corresponds to the bandwidth or part of the bandwidth of the material item. There are various techniques for effecting this bandwidth increase. For the example embodiment shown in FIG. 5, the bandwidth increase is effected in both the temporal and spatial domains. In other embodiments, the bandwidth increase may be spatially or temporally effected. The first adaptation processor comprises a temporal up-sampler 126 and a spatial up-sampler 128. An example implementation of a temporal up-sampler 126 is shown in FIG. 6 and an example of a spatial up-sampler 128 is shown in FIG. 7.

Figure 6:
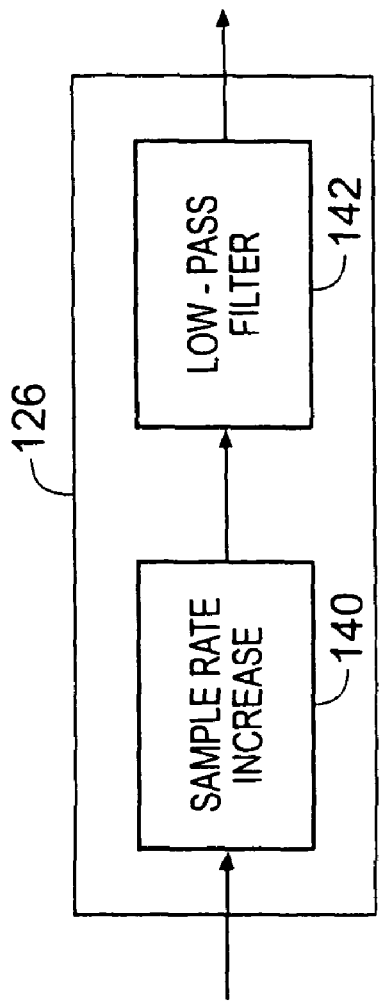
FIG. 6 is a schematic block diagram of a temporal up-sampler forming part of the encoding data processor shown in FIG. 5.

The temporal up-sampler 126 shown in FIG. 6 comprises a sample rate increase processor 140 and a low pass filter 142. The sample rate increase processor 140 is arranged to increase the sample rate of the code word by introducing samples between the code word coefficients in accordance with a desired temporal bandwidth increase. The low-pass filter has a pass-band, which corresponds to the temporal bandwidth of the material item. As such by passing the up-sampled version of the code word through the low-pass filter, an interpolation of the code word samples is formed, which has an effect of spreading the temporal bandwidth of the code word across the bandwidth of the material item.

Figure 7:
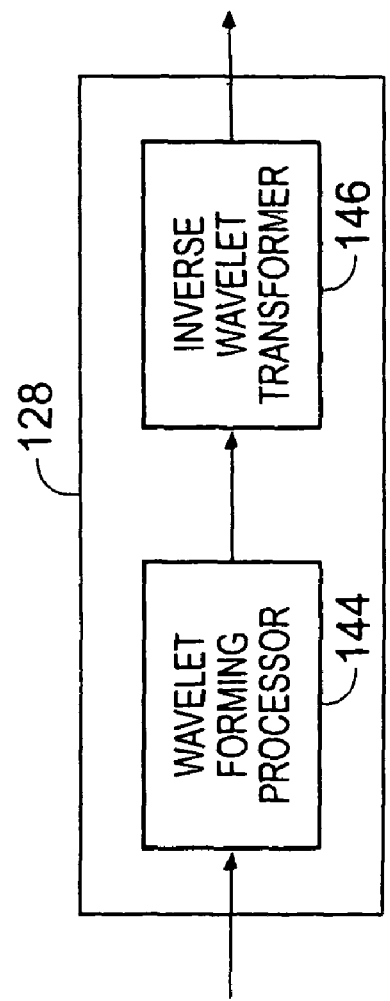
FIG. 7 is a schematic block diagram of a spatial up-sampler forming part of the encoding data processor shown in FIG. 5.

The spatial up-sampler shown in FIG. 7 comprises a wavelet forming processor and an inverse wavelet transformer 146. The up-sampler performs an eight times spatial up-sampling by forming the code word into the lowest frequencies sub-band of a second order wavelet transform. The second order wavelet transform is formed by the wavelet forming processor 144. The coefficients of the other sub-bands are set to zero. The inverse wavelet transformer then performs an inverse wavelet transform on the formed wavelet, which has an effect of spatially up-sampling the code word by a factor eight.

Figure 8:
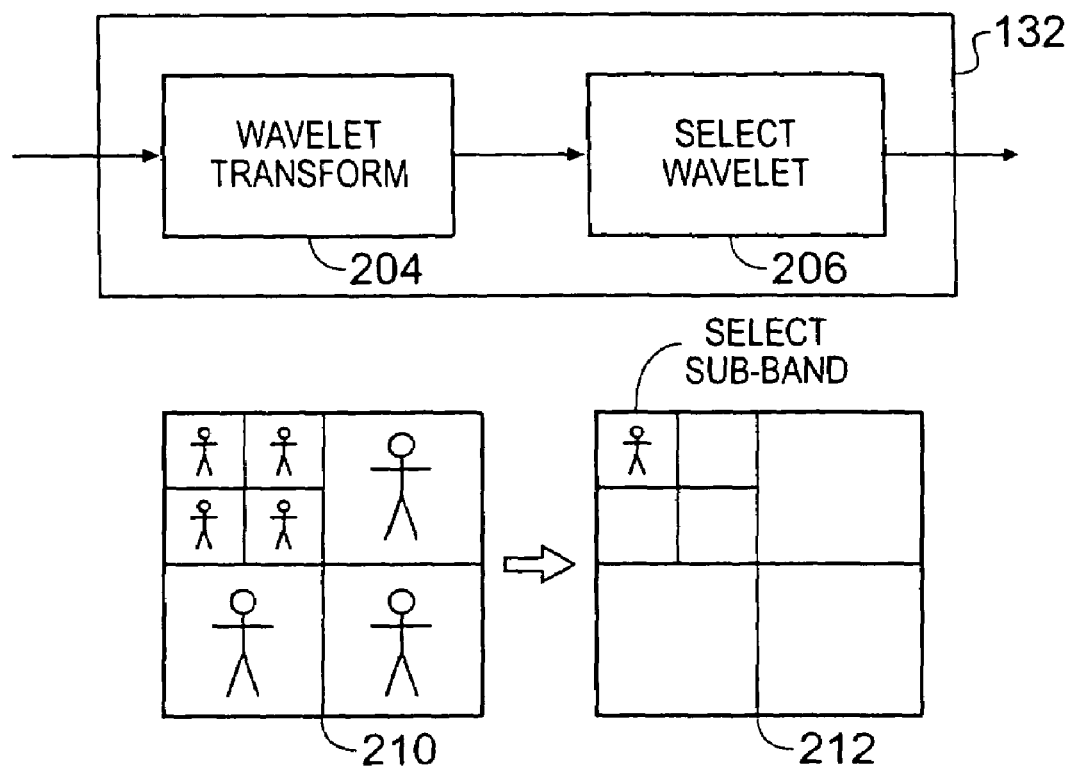
FIG. 8 is a schematic block diagram of a spatial sub-sampler forming part of the data processing apparatus shown in FIG. 5.
Figure 9:
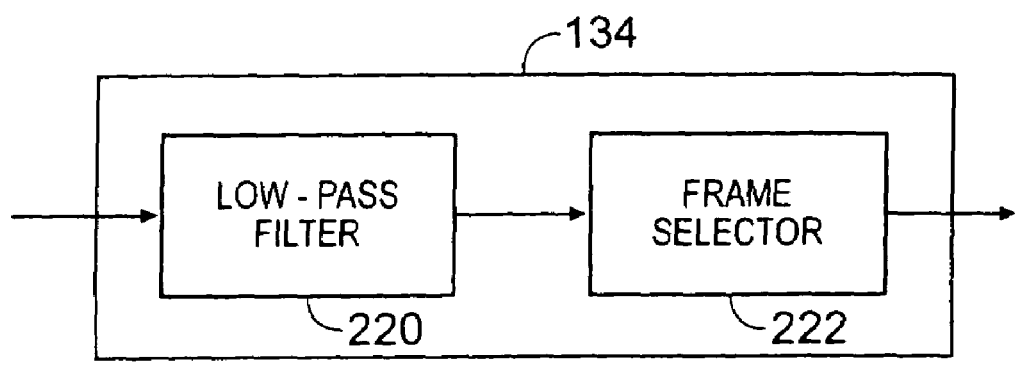
FIG. 9 is a schematic block diagram of a temporal sub-sampler forming part of the data processing apparatus shown in FIG. 5.

Returning to FIG. 5, the second adaptation processor which produces the reduced-bandwidth-version of the material item comprises a spatial sub-sampler 132 and a temporal sub-sampler 134. As will be appreciated, there are various techniques for implementing a bandwidth reduction on a data signal. However as explained above the second adaptation processor generates the reduced-bandwidth-version of the original material item in correspondence with the bandwidth increase performed on the code word. FIGS. 8 and 9 provide block diagrams of example implementations of the spatial and temporal sub-samplers 132, 134.

In FIG. 8, the spatial sub-sampler comprises a wavelet transformer 204 and a wavelet selector 206. The spatial sub-sampling is implemented using the wavelet transform. To this end, the wavelet transformer 204 is arranged to generate a second order wavelet transform of the material. The wavelet selector 206 is then arranged to select the lowest frequency wavelet sub-band, setting the wavelet coefficients in the other sub-bands to zero. This is illustrated in FIG. 8, by a representation of a wavelet transform of a video frame 210, formed by the wavelet transformer 204, and an illustration of the wavelet transformed frame 212 formed after processing by the wavelet selector 206. By selecting the lowest frequency wavelet sub-band of a second order wavelet transformed image, a spatially sub-sampled version of the video frame is formed, which has been down-sampled by a factor of eight.

Correspondingly, the temporal sub-sampler 134 illustrated in FIG. 8 includes a low-pass filter 220, which functions as an anti-aliasing filter for the temporally sub-sampled material. The bandwidth of the low pass filter is therefore set in accordance with a rate at which the material is to be sub-sampled. For the illustrative example, the temporal sub-sampling rate is four. Accordingly, after the low pass filter 220, a frame selector 222 is operable to select every fourth frame of the material, discarding the other frames, to form the temporally sub-sampled material.

Detection Data Processor

As already explained, a code word which is present in a marked version of a material item, can be detected with a predetermined false positive and false negative detection probabilities. The detection data processor illustrated in FIG. 2 can be arranged correspondingly to detect whether a code word is present in a suspect material item. However, because the code word has been combined with a low bandwidth component of the material item, some adaptation of the detecting data processor shown in FIG. 2 is required. A data detecting processor according to an example embodiment of the invention is shown in FIG. 10.

Figure 10:
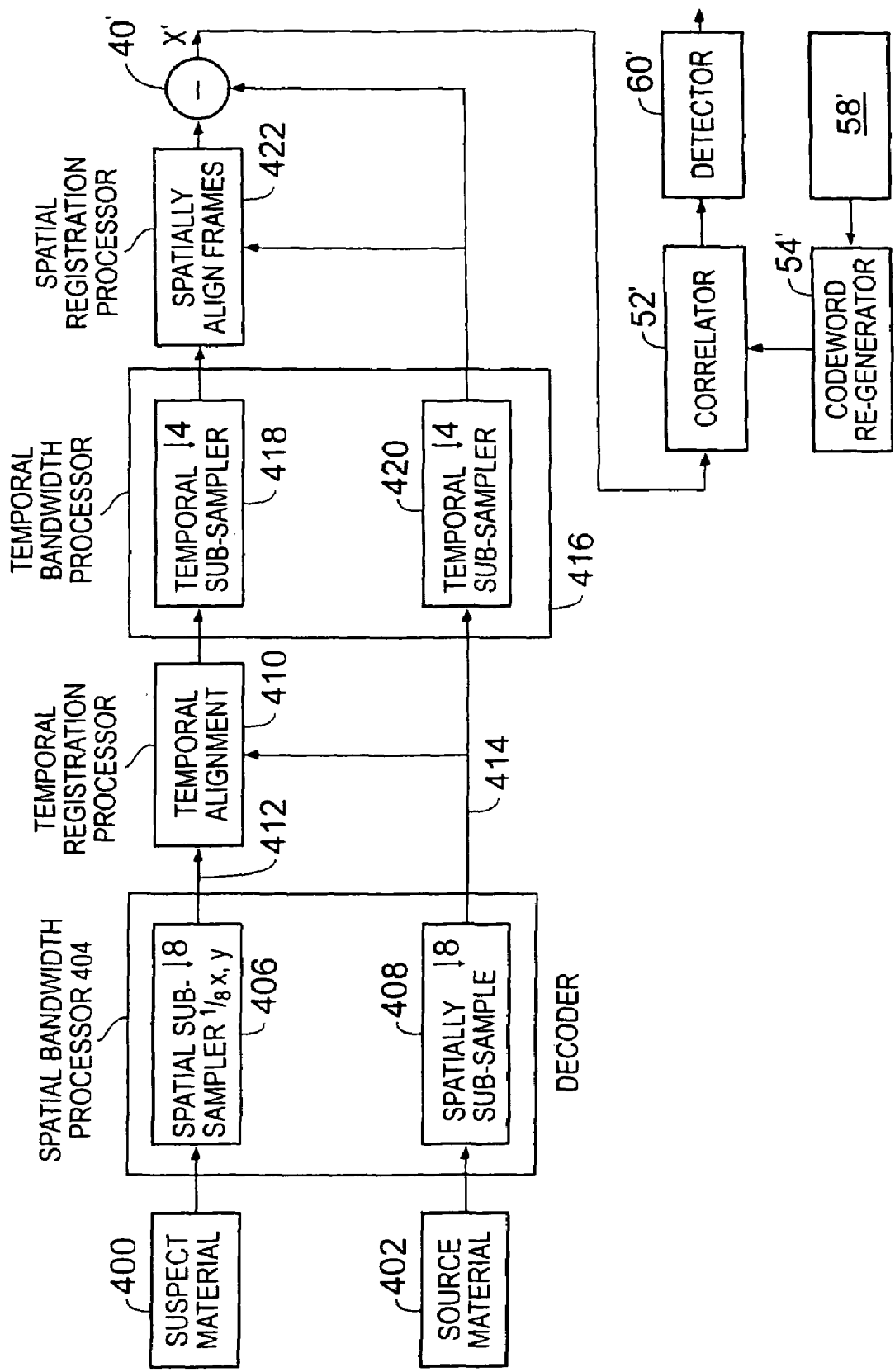
FIG. 10 is a schematic block diagram of a detecting data processing apparatus, which operates to detect watermark code words in the marked material items.

In FIG. 10 the suspect material is fed from a store 400 to a spatial bandwidth processor 404. Also fed to the spatial bandwidth processor 404 is a copy of the original source material from a second store 402. The spatial bandwidth processor 404 comprises a first spatial sub-sampler 406 and a second spatial sub-sampler 408. The first and second spatial sub-samplers 404, 406 are arranged to perform spatial sub-sampling at a rate which corresponds to the up-sampling performed by the spatial up-sampler 128 performed by the encoding data processor illustrated in FIG. 5. For this example, the spatial sub-sampling rate is one eighth. The spatial sub-samplers 406, 408 can be implemented as illustrated in FIG. 7, as explained above. As will be appreciated the same spatial sub-sampler could be used for both the suspect and the original material versions.

The spatially sub-sampled versions of the suspect and the original material items are receive by a temporal registration processor 410 from connecting channels 412, 414. The temporal registration processor 410 operates to temporally align the suspect and the original material items to the effect that the samples of the original version are correspondingly synchronised to the samples of the suspect version of the material item.

The temporally aligned suspect and original material items are then fed to a temporal bandwidth processor 416. The temporal bandwidth processor 416 includes a first temporal sub-sampler 418 and a second temporal sub-sampler 420, which are arranged to received the temporally aligned suspect and original material items respectively. Temporal sub-sampling is performed by the first and second temporal sub-samplers 418, 420 on the suspect and original material items in correspondence with the temporal up-sampling rate performed by the up-sampler 126 in the encoding data processing apparatus 101 of FIG. 5. The temporally and spatially sub-sampled version of the suspect and original material items are then received by a spatial registration processor 422. The spatial registration processor 422 is operable to provide a spatial alignment of the samples of the suspect and the original material items.

The spatial and the temporal bandwidth processors 404, 416 operate to form reduced-bandwidth-versions of the suspect and copy of the original material items. In effect the temporal and spatial registration processors 410, 422 are arranged to associate the samples of the reduced-bandwidth-versions of the suspect and the copy of the original material items. Effectively, therefore a subtracting processor 40' receives respective samples of the suspect and the original material items to which code word coefficients may have been added. A result of the subtraction is to form a vector of samples X' which represents a recovered code word. The recovered code word X' is then fed to a correlator 52' which operates in combination with the detector 60', as already explained with respect to the detecting data processor of FIG. 2 to determine whether the recovered code word corresponds to one of the set of code words. The explanation will, therefore not be repeated here. The detected code word can then uniquely identify a recipient of the offending material item.

The operation of the encoding data processor to adapt the bandwidth of the code word and combine the code word coefficients with the material item represents a linear mathematical process. As a result in alternative embodiments, the detecting data processor may be arranged to subtract the copy of the material item from the suspect material item and then proceed to form a reduced-bandwidth-version of the difference. The reduced-bandwidth-version of the difference is then correlated with the code words from the set of code words to identify if a code word is present in the suspect material as already explained. However, as will be explained in the following paragraphs, forming the reduced-bandwidth-versions of the suspect and the original material items provides an advantage in reducing an amount of processing required to register the suspect and copy of the original material items.

Improved Registration Process

Embodiments of the present invention can provide an improved facility for aligning the spatially and temporally sub-sampled versions of the suspect and the copy of the original material item. As such an improvement can be provided in the probability of correctly detecting a code word which is present in an offending material item. The improvement in the registration of the suspect material with the copy of the original material is provided by a multi-stage nested alignment process.

As indicated above, the code word detection processor includes a registration processor comprising the temporal alignment processor 410 and the spatial alignment processor 422. The temporal alignment processor 410 is operable to provide a first temporal alignment of the suspect and original material items. There are various ways in which this can be achieved. For example, for material representing moving images such as a film or a video reproduction, scene changes in the material can be detected from significant changes in the chrominance and/or luminance values between frames of the material. By matching the relative times at which these changes occur, in the suspect and original material items, an estimate of temporal alignment is provided. However as will be appreciated, the suspect material may have a frame rate which differs from the original because the suspect material has been generated in accordance with a different recording or storage format. As such, in order to identify a scene change which falls between a frame boundary, the suspect material may be further up-sampled by introducing a frames amongst those of the suspect material in accordance with an increased frame rate. Low-pass filtering the up-sampled suspect material provides an interpolated version of the suspect material from which a scene change can be more easily identified.

An advantage is provided by performing temporal alignment after the suspect and original material items have been sub-sampled. This is because the code word has been embedded in the low bandwidth portion to form the marked material items. For this reason, the code word in the material will be less likely to be effected by sub-sampling the suspect and original material items before temporal alignment. Hence the spatial bandwidth processor 404 can sub-sample the suspect and original material items before temporal alignment is performed by the temporal registration processors 406, 408. As a result a time taken to determine the temporal alignment estimate may be substantially reduced, as a result of a reduction in an amount of processing required.

As explained above, after the temporal sub-sampling by the temporal bandwidth processor 416, the spatial registration processor performs a further spatial alignment between the suspect and the original material items. The operation of the spatial registration processor 422 will now be explained in the following paragraphs with reference to FIG. 11.

The spatial alignment processor 422 is arranged to form a set of increasingly spatially sub-sampled versions of the suspect and original material items. For the example illustrated in FIG. 11, two increasingly spatially sub-sampled versions are formed SSV1, SSV2. For a first example frame C of the suspect material item, two increasingly sub-sampled versions SSV1, SSV2 produce two frames A, B, from a first frame C, of the sub-sampled suspect material version SV. The correspondingly increasingly sub-sampled versions A', B' for the two levels SSV1, SSV2 are formed for the original material item frame C'. The spatial alignment processor 422 is then operable to perform a nested spatial alignment process as follows:

(i) The most spatially sub-sampled frames A, A' of the suspect and original material items are compared;

(ii) A result of the comparison provides an indication of the spatial misalignment between the suspect and original material versions for the most spatially sub-sampled frame A, A';

(iii) In accordance with any misalignment of the frames A, A', determined in (ii) an alignment of the next most spatially sub-sampled frames B, B' is performed;

(iv) The next most spatially sub-sampled frames B, B' of the suspect and original material items are then compared;

(v) A result of the comparison provides an indication of any spatial misalignment between the suspect and original material versions for the least spatially sub-sampled frames C, C';

(vi) In accordance with the determined misalignment of the frames B, B' of the level SSV1, an alignment of the least spatially sub-sampled frames C, C' is performed;

(vii) Steps (i) to (vi) are repeated for a subsequent set of increasingly sub-sampled frames.

Figure 11:
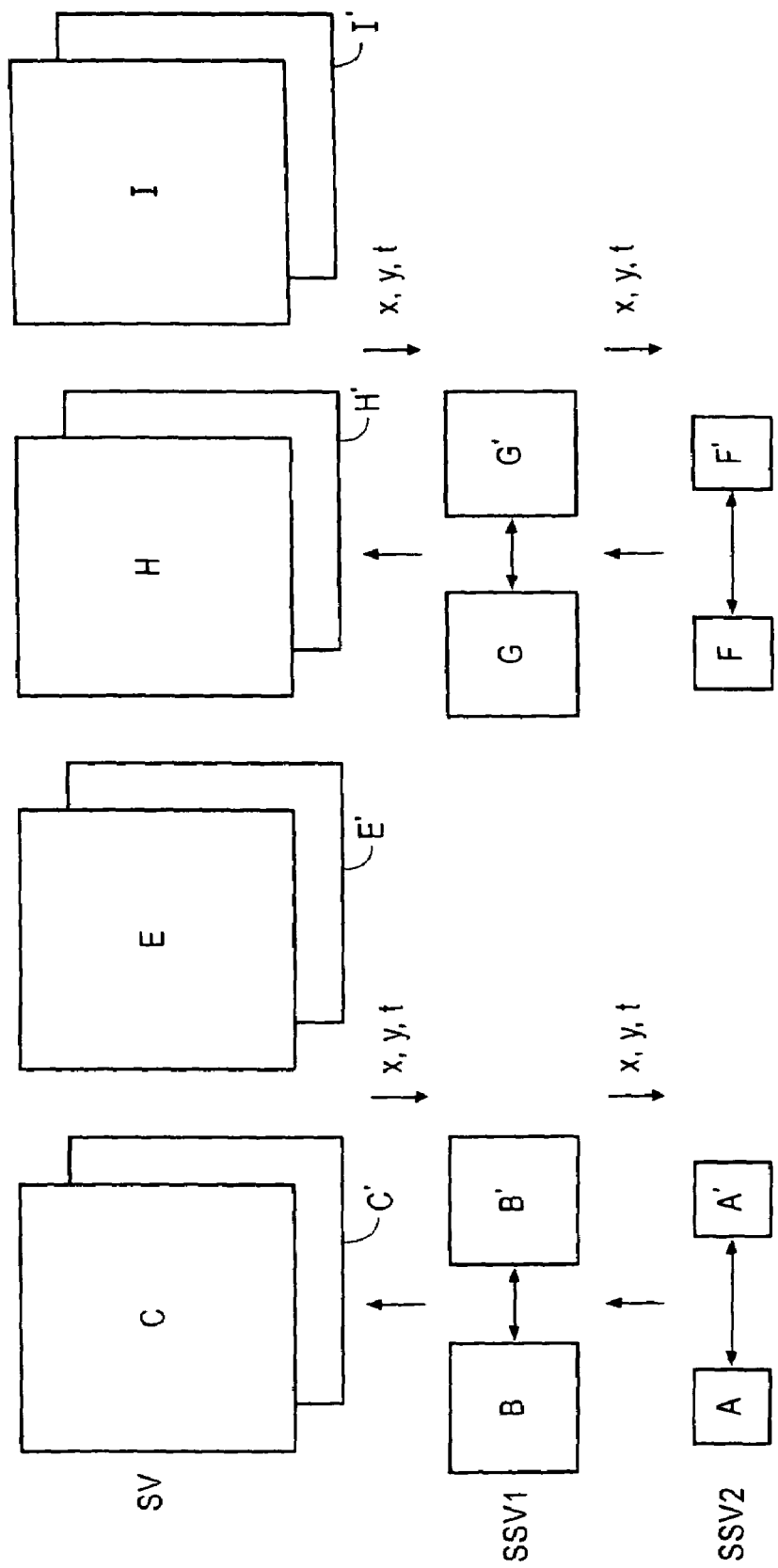
FIG. 11 is a representation of spatially sub-sampled video frames having three levels of sub-sampling to illustrate a nested alignment process according to an embodiment of the invention.

As illustrated in FIG. 11, the nested alignment process for increasing levels of spatially sub-sampled frames may not be performed for every frame of the suspect and original material items. The nested alignment of frames may be performed at a rate which corresponds to an amount by which spatial misalignment between the suspect and original material may have occurred. Therefore as illustrated in FIG. 11, nested alignment is performed every other frame. It will be appreciated that other rates are envisaged in accordance with a possible rate of change of misalignment such as one in three or one in four frames are aligned in accordance with the nested process.

The nested alignment process for different amounts of spatial sub-sampling has an advantage in both improving the accuracy of the spatial alignment, and reducing an amount of processing which is required to effect spatial alignment. In addition, the application of the code word to the low spatial frequencies reduces the sensitivity of the code word detection process to misalignment.

Figure 12:
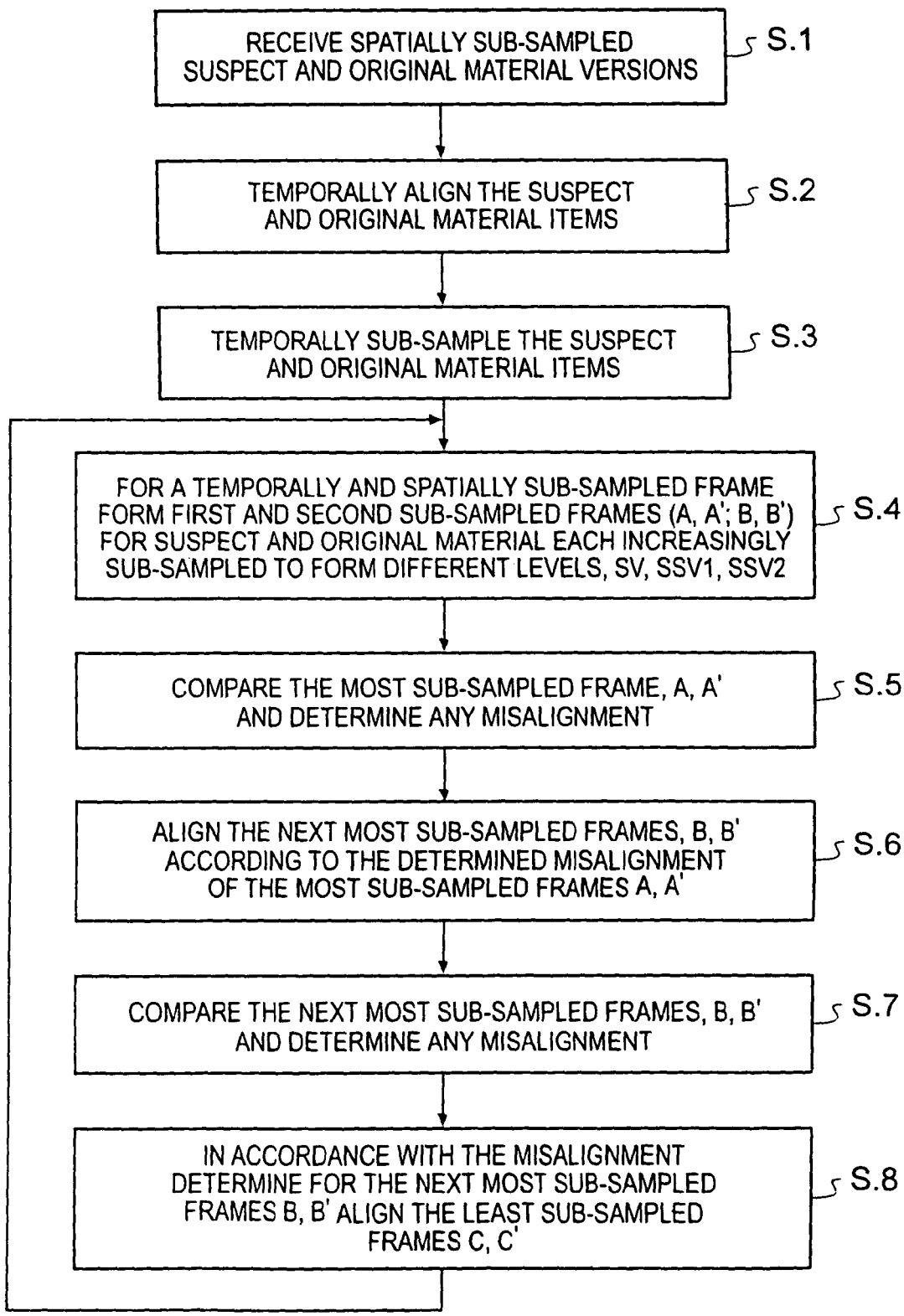
FIG. 12 is a flow diagram representing the operation of the registration processor according to the nested alignment process embodying the invention.

A flow diagram illustrating the operation of the registration processor is provided in FIG. 12. The operation of the registration processor is summarised as follows with reference to FIG. 12:

S.1: The spatially sub-sampled suspect and original material items are received by the temporal alignment processor 410.

S.2: Transitions, scene changes or edit points in the material are detected and temporal alignment is performed.

S.3: The spatially sub-sampled suspect and original material items are temporally sub-sampled.

S.4: For a sample frame of the temporally and spatially sub-sampled suspect and original material items, two further increasingly spatially sub-sampled frames are formed corresponding to two increasingly spatially sub-sampled levels SSV1, SSV2.

S.5: For the lowest level SSV2, comprising the most temporally and spatially sub-sampled frames A, A', the frames A, A' are compared and any misalignment determined.

S.6: The frames at the next level of sub-sampling SSV1 are aligned in accordance with the determined misalignment for the most sub-sampled frames A, A'.

S.7: The next most sub-sampled frames B, B' are compared and any misalignment determined.

S.8: In accordance with the misalignment determined for the next most sub-sampled frames B, B', the least sub-sampled frames of the suspect and original material items C, C' are aligned.

The frame alignment process is then repeated for subsequent frames.

Various further aspects and features of the present invention are defined in the appended claims. Various modifications can be made to the embodiments herein before described without departing from the scope of the present invention.

The invention claimed is:

1. An encoding data processing apparatus for generating at least one version of an original material item formed by combining one of a predetermined set of code words into a copy of the original material item, the apparatus comprising a bandwidth adaptation processor configured to adapt a bandwidth of the code word with respect to a part of bandwidth of the original material item, and an encoder configured to combine the bandwidth adapted code word with a copy of the original material item, with an effect that the bandwidth adapted code word is combined with the part of the bandwidth of the original material item.

2. An encoding data processing apparatus as claimed in claim 1, wherein the bandwidth adaptation processor is configured to increase the bandwidth of the code word in accordance with a ratio of a reduced-bandwidth-version of the original material item to the part of the bandwidth of the original material item with which the code word is to be combined.

3. An encoding data processing apparatus as claimed in claim 1, wherein the bandwidth increase provided by the bandwidth adaptation processor is made in at least one of temporal or spatial domains.

4. An encoding data processing apparatus as claimed in claim 1, wherein the bandwidth adaptation processor comprises first and second adaptation processors, the first adaptation processor configured to increase the bandwidth of the code word in accordance with at least one of the temporal or spatial domains, and the second adaptation processor configured to form a reduced-bandwidth-version of the original material item, the bandwidth reduction being at least one of temporally or spatially effected and in accordance with the increase to the code word bandwidth by the first adaptation processor, wherein the encoder is configured to adapt coefficients of the code word with respect to the samples of the reduced-bandwidth-version of the original material item to which the code word coefficients are to be combined, the adaptation of the code word coefficients with respect to the reduced-bandwidth-version being made to the effect of reducing a likelihood of the code word being perceivable in a marked representation of the original material item.

5. An encoding data processing apparatus as claimed in claim 4, wherein the first adaptation processor includes a temporal up-sampler configured to introduce samples into the code word in accordance with an increased sampling rate, and a low-pass filter configured to filter the up-sampled code word, wherein a bandwidth of the low-pass filter and the up-sampling rate has an effect of increasing the bandwidth of the code word with respect to the bandwidth corresponding to the original material item.

6. An encoding data processing apparatus as claimed in claim 4, wherein the first adaptation processor comprises a spatial up-sampler configured to convert the bandwidth of the code word substantially to the spatial bandwidth of the original material item.

7. An encoding data processing apparatus as claimed in claim 6, wherein the spatial up-sampler operates to form the code word into a sub-band representing a wavelet transform sub-band and to perform an inverse wavelet transform on a set of sub-bands corresponding to a wavelet transform of the spatial bandwidth of the original material item, the other sub-bands being set to zero.

8. An encoding data processing apparatus as claimed in claim 4, wherein the second adaptation processor includes a temporal sub-sampler configured to form the reduced-bandwidth-version of the original material item.

9. An encoding data processing apparatus as claimed in claim 8, wherein the temporal sub-sampler comprises a low-pass filter in combination with a sample selector configured to selectively sample the original material item after low-pass filtering.

10. An encoding data processing apparatus as claimed in claim 4, wherein the second adaptation processor includes a spatial sub-sampler configured to form the reduced-bandwidth-version of the original material item.

11. An encoding data processing apparatus as claimed in claim 10, wherein the spatial sub-sampler comprises a wavelet transform processor configured to form a wavelet transform of the original material item and a sample selector configured to select one of a plurality of sub-bands of the wavelet transform to form the reduced-bandwidth-version of the original material item.

12. An encoding data processing apparatus as claimed in claim 1, comprising a code word generator configured to generate the code word using a pseudo-random number generator initialized with a seed value uniquely associated with the code word, the code word coefficients being formed from numbers generated by the pseudo-random number generator.

13. An encoding data processing apparatus as claimed in claim 12, comprising a discrete cosine transform processor configured to transform the original material item into the discrete cosine transform domain, the original material item in the discrete cosine transform domain being represented as a plurality of discrete cosine transform coefficients, wherein the encoder is configured to combine the bandwidth adapted code word with the original material item by adding each of the adapted code word coefficients to a corresponding one of the discrete cosine transform coefficients, and an inverse discrete cosine transform processor configured to form a marked version of the original material item by performing an inverse discrete cosine transform on the discrete cosine transformed material item to which the code word has been added by the encoder.

14. A computer readable medium encoded with a computer program providing computer executable instructions, which when loaded onto the computer, configures the computer to operate as an encoding data processing apparatus according to claim 1.

15. An encoding data processing apparatus as claimed in claim 1, wherein the bandwidth adaptation processor is configured to convert the bandwidth of the code word to the part of the bandwidth of the original material item.

16. A detecting data processing apparatus configured to determine whether one or more code words of a predetermined set of code words is present in a suspected version of an original material item, the suspected version having been assumed to have been formed by combining a code word with part of the bandwidth of the original material item, said apparatus comprising a bandwidth processor configured to form a reduced-bandwidth-version of a copy of the original material item and a reduced-bandwidth-version of the suspected version of the material, or a reduced-bandwidth-version of a difference between the original and suspect material items, the bandwidth reduction being arranged to isolate the part of the bandwidth of the material to which the code word may have been combined, a recovery processor configured to generate a recovered code word from the reduced-bandwidth-versions of the original and suspect material items or reduced-bandwidth-version difference between the suspect and original material items, a correlation processor configured to generate, for each of the code words in the predetermined set of code words a correlation value by correlating the recovered code word with each of the generated code words, and a detection processor configured to detect one or more code words from the correlation value for the code word exceeding a predetermined threshold.

17. A detecting data processing apparatus as claimed in claim 16, comprising a registering processor configured to associate samples of the original material item and the suspect version of the original material item to which corresponding code word coefficients may have been combined, the registration processor being configured in combination with the bandwidth adaptation processor to perform the association as part of the bandwidth reduction.

18. A detecting data processing apparatus as claimed in claim 16, wherein the code word has been introduced into the bandwidth of the suspect material item at least one of temporally or spatially and correspondingly the bandwidth adaptation processor is configured to perform the bandwidth reduction at least one of temporally or spatially.

19. A detecting data processing apparatus as claimed in claim 16, wherein the correlation processor includes a code word generator epeiable configured to generate pseudo-random numbers from which said regenerated code word coefficients are formed, the pseudo-random numbers being generated from a seed value uniquely associated with said code word.

20. A detecting data processing apparatus as claimed in claim 19, wherein the seed value is formed from flue samples of the marked version of the original material item.

21. A detecting data processing apparatus as claimed in claim 16, wherein the code word has been introduced into the original material item in the discrete cosine transform domain, the apparatus comprising a discrete cosine transform processor configured to transform the suspected reduced-bandwidth-version of the original material item and the reduced-bandwidth-copy of the original material item into the discrete cosine transform domain, wherein the recovery processor is configured to generate the recovered code word by subtracting corresponding discrete cosine transform coefficients of the original material version from discrete cosine transform coefficients of the marked material version.

22. A computer readable medium encoded with a computer program providing computer executable instructions, which when loaded onto the computer, causes the computer to operate as a detecting data processor according to claim 16.

23. A system for identifying the recipient of a material item, the system comprising an encoding data processing apparatus for generating at least one version of an original material item formed by combining one of a predetermined set of code words into a copy of the original material item, the apparatus comprising a bandwidth adaptation processor configured to adapt a bandwidth of the code word with respect to a part of bandwidth of the original material item, and an encoder configured to combine the bandwidth adapted code word with a copy of the original material item, with an effect that the bandwidth adapted code word is combined with the part of the bandwidth of the original material item, and a detecting data processor apparatus according to claim 14, configured to detect with a predetermined false positive probability the recipient by detecting the presence or absence of the code word in the material.

24. A method of generating at least one version of an original material item, formed by introducing one of a predetermined set of code words into a copy of the original material item, the method comprising adapting a bandwidth of the code word with respect to a part of bandwidth of the original material item, and combining the bandwidth adapted code word with a copy of the original material item, with an effect that the bandwidth adapted code word is combined with the part of the bandwidth of the original material item.

25. A method as claimed in claim 24, wherein the adapting the bandwidth is increasing the bandwidth of the code word in accordance with a ratio of a reduced-bandwidth-version of the original material item to the bandwidth of the original material item or part thereof with which the code word is to be combined.

26. A computer readable medium encoded with a computer program providing computer executable instructions, which when loaded on to the computer, causes the computer to perform the method according to claim 24.

27. A method as claimed in claim 24, wherein the adapting of the bandwidth of the code word comprises converting the bandwidth of the code word to the part of the bandwidth of the original material item.

28. An apparatus for generating at least one version of an original material item, formed by introducing one of a predetermined set of code words into a copy of the original material item, the apparatus comprising means for adapting a bandwidth of the code word with respect to a part of bandwidth of the original material item, and means for combining the bandwidth adapted code word with a copy of the original material item, with an effect that the bandwidth adapted code word is combined with the part of the bandwidth of the original material item.

29. An apparatus as claimed in claim 28, wherein the means for adapting the bandwidth is configured to increase the bandwidth of the code word in accordance with a ratio of a reduced-bandwidth-version of the original material item to the bandwidth of the original material item or part thereof with which the code word is to be combined.

30. An apparatus as claimed in claim 28, wherein the means for adapting comprises means for converting the bandwidth of the code word to the part of the bandwidth of the original material item.

31. A method of determining whether one or more code words of a predetermined set of code words is present in a suspected version of a material item, the suspected version having been assumed to have been formed by combining a code word having a lower-bandwidth with respect to a part of bandwidth of an original material item, the method comprising forming a reduced-bandwidth-version of a copy of the original material item and a reduced-bandwidth-version of the suspected version, or a reduced-bandwidth-version of a difference between the original material item and the suspected version, the bandwidth reduction being arranged to isolate the part of the bandwidth of the original material item to which the code word may have been combined, generating a recovered code word from the reduced-bandwidth-versions of the original material item and the suspected version, or the reduced-bandwidth-version of the difference between the original material item and the suspected version, generating for each of the code words in the predetermined set of code words a correlation value by correlating the recovered code word with each of the generated code words, and detecting one or more code words from the correlation value for the code word exceeding a predetermined threshold.

32. An apparatus for determining whether one or more code words of a predetermined set of code words is present in a suspected version of a material item, the suspected version having been assumed to have been formed by combining a code word having a lower-bandwidth with respect to a part of bandwidth of an original material item, the apparatus comprising means for forming a reduced-bandwidth-version of a copy of the original material item and a reduced-bandwidth-version of the suspected version, or a reduced-bandwidth-version of a difference between the original material item and the suspected version, the bandwidth reduction being arranged to isolate the part of the bandwidth of the original material item to which the code word may have been combined, means for generating a recovered code word from the reduced-bandwidth-versions of the original material item and the suspected version, items or the reduced-bandwidth-version of the difference between the original material item and the suspected version, means for generating for each of the code words in the predetermined set of code words a correlation value by correlating the recovered code word with each of the generated code words, and means for detecting one or more code words from the correlation value for the code word exceeding a predetermined threshold.

* * * * *